United States Patent
Couse et al.

(10) Patent No.: US 8,699,679 B2
(45) Date of Patent: Apr. 15, 2014

(54) SYSTEM APPARATUS AND METHOD FOR ACCESSING SCHEDULING INFORMATION

(75) Inventors: Peter Francis Couse, Ottawa (CA); Ron Wellard, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 635 days.

(21) Appl. No.: 12/798,414

(22) Filed: Mar. 31, 2010

(65) Prior Publication Data

US 2011/0243313 A1    Oct. 6, 2011

(51) Int. Cl.
*H04M 11/00*    (2006.01)

(52) U.S. Cl.
USPC ............... 379/93.02; 379/210.11; 705/7.18; 715/963

(58) Field of Classification Search
USPC ............ 379/210.01, 93.02–93.04; 707/784; 370/352; 382/276; 725/25, 29, 30; 705/7.18–7.22, 7.24; 715/963
See application file for complete search history.

(56) References Cited

U.S. PATENT DOCUMENTS

| | | | | |
|---|---|---|---|---|
| 5,815,566 A | * | 9/1998 | Ramot et al. | 379/210.01 |
| 2005/0119992 A1 | | 6/2005 | Martino | |
| 2006/0159367 A1 | * | 7/2006 | Zeineh et al. | 382/276 |
| 2007/0026852 A1 | | 2/2007 | Logan et al. | |
| 2007/0115923 A1 | * | 5/2007 | Denny et al. | 370/352 |
| 2010/0268741 A1 | * | 10/2010 | Holzapfel et al. | 707/784 |

FOREIGN PATENT DOCUMENTS

WO    WO 2007/123959    11/2007

* cited by examiner

*Primary Examiner* — Md S Elahee

(57) ABSTRACT

A system for accessing scheduling information. In one illustrative embodiment, a user can log into a phone system by entering their extension number and passcode, which allows the phone to assume their profile. The user then enters the credentials required to access their PC based calendar information, which is stored by a server application. The server application can look up the scheduling information that is stored in the user's PC based calendar application on a message server. The information can then be provided to the phone by the server application where it is displayed. Application programming interfaces can facilitate communications between the phone and the server application and the server application and the message server. Other information located on the message server can also be retrieved through the server application and is not limited to scheduling information.

19 Claims, 8 Drawing Sheets

| 2:25 PM FEB 12, 2010 |
|---|
| PHONE BOOK |
| MESSAGING |
| HOT DESK |
| SIMON |
| MAUREEN |
| DON CELL |
| CALL HISTORY |
| ORDER DESK |
| IT HELP LINE |
| DND |
| MY NEXT MEETING |
| HOME |

FIG. 4A

| 2:26 PM FEB 12, 2010 |
|---|
| DATE: MONDAY FEB 15, 2010 |
| TIME: 11:00AM - 12:00PM |
| TOPIC: QUARTERLY SALES |
| REVIEW & FORECAST UPDATE |
| LOCATION: BOARD ROOM |
| ATTENDEES: |
| DON SMITH |
| SIMON BINDER |
| MAUREEN YOUNG |
| JOHN DOE |
| VIEW TODAY |
| HOME |

FIG. 4B

| 2:26 PM FEB 12, 2010 |
|---|
| DATE: MONDAY FEB 15, 2010 |
| TIME: 11:00AM - 12:00PM |
| TOPIC: QUARTERLY SALES |
| REVIEW & FORECAST UPDATE |
| LOCATION: BOARD ROOM |
| CONTACT DON SMITH |
| WORK EXTENSION: 5678 |
| CELL PHONE @ 613-555-1234 |
| IM: DONSMITH@HOTMAIL.COM |
| EMAIL: DON_SMITH@ABC.COM |
| BACK |
| HOME |

FIG. 4C

| 2:25 PM FEB 12, 2010 | |
|---|---|
| TODAY'S CALENDAR | |
| 8 AM | |
| 9 AM | |
| 10 AM | |
| 11 AM | QUARTERLY SALES REV.. |
| 12 PM | |
| 1PM | STAFF MEETING |
| 2PM | |
| 3PM | |
| 4PM | |
| 5PM | |
| HOME | |

FIG. 4D

SYSTEM APPARATUS AND METHOD FOR ACCESSING SCHEDULING INFORMATION

TECHNICAL FIELD

This application generally relates to communications, and more particularly, to accessing scheduling information on a data repository to display on a requesting phone.

BACKGROUND

In today's business environment, professionals frequently go from one meeting to the next. Often, to keep track of their meetings, the professional would have to run back to their desk and login to their computer. The professional could then find out when and where their next scheduled meeting was located. Typically, this information was set up in a PC based calendar application such as Microsoft's Outlook®. In some instances, by going back to their office and logging onto their computer, valuable time would pass. This wasted time would result in the professional being late for meetings if not miss them completely.

While smartphones and personal digital assistants (PDAs) have become commonplace, many companies still do not provide these devices to their employees. Furthermore, many of these devices are not synced with their work PC based calendar application. As a result, even though the professional uses a smartphone or PDA, the professional would still have to return to their desk and login to their PC in order to access their PC based calendar application.

To overcome these previously described limitations, professionals would take the time to manually copy their meetings from their PC based calendar application onto a paper agenda. Nevertheless, this method is problematic in today's electronic age as meeting information such as the meeting location or a change in the start time could happen on the fly. Meeting organizers rely on attendee's having access to electronic calendars that inform them of changes as they happen—something that is not possible when the professional does not have direct access to their PC based calendar application.

A need therefore exists for a system and method whereby the professional can access their scheduling information while overcoming the above-described limitations as well as other limitations which will become apparent from the discussion below.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

FIG. 4A depicts a typical screen on the display of the IP phone used to "Hot Sync" the IP phone in accordance with one aspect of the present application;

FIG. 4B provides an exemplary screen for showing the user's next meeting in accordance with one aspect of the present application;

FIG. 4C illustrates a screen showing exemplary contact information for an attendee in accordance with one aspect of the present application;

FIG. 4D shows an illustrative screen for displaying a user's meetings for the day in accordance with one aspect of the present application;

DESCRIPTION OF THE APPLICATION

The description set forth below in connection with the appended drawings is intended as a description of presently-preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Overview

The present application relates to communications, and more particularly, to a server application for accessing scheduling information on a message server to display on a requesting phone. In one illustrative embodiment, scheduling information can be obtained using a phone. Through the phone, a user can log into a Voice over Internet Protocol (VoIP) phone system by entering their extension number and passcode. By logging into the VoIP phone system, the phone can retrieve the user's profile which the phone can thereafter assume. The user's profile can provide a number of features and options for the phone. One feature, a "My Next Meeting" feature, can be invoked on the phone for retrieving scheduling information from a server application. Typically, user credentials are provided the first time the user invokes the "My Next Meeting" feature. This can cause the server application on a web server to log into a message server using the user's credentials that are gathered from the phone. The server application can extract the scheduling information from the message server and send it on the phone.

The embodiment described above can provide a convenient tool that allows a user to avoid having to go back to their desk to find out their next meeting. Furthermore, the tool can provide the ability for an individual who does not have a smartphone or personal digital assistant (PDA) to gain access to information on their next scheduled meeting as captured in their PC based calendar application by simply logging into a nearby phone. Generally described, the tool can allow a user to gain access to information on their next scheduled meeting using a network phone.

In the illustrative embodiment, the message server provided scheduling information. Scheduling information can include, but is not limited to, meetings, appointments, etc. Those skilled in the relevant art will appreciate that other types of information can be provided by the message server and displayed on the phone as well. This information can include a user's contacts, email addresses, tasks, etc. Other data can also be retrieved and will become apparent from the discussion presented below.

Environment

Figure 1:
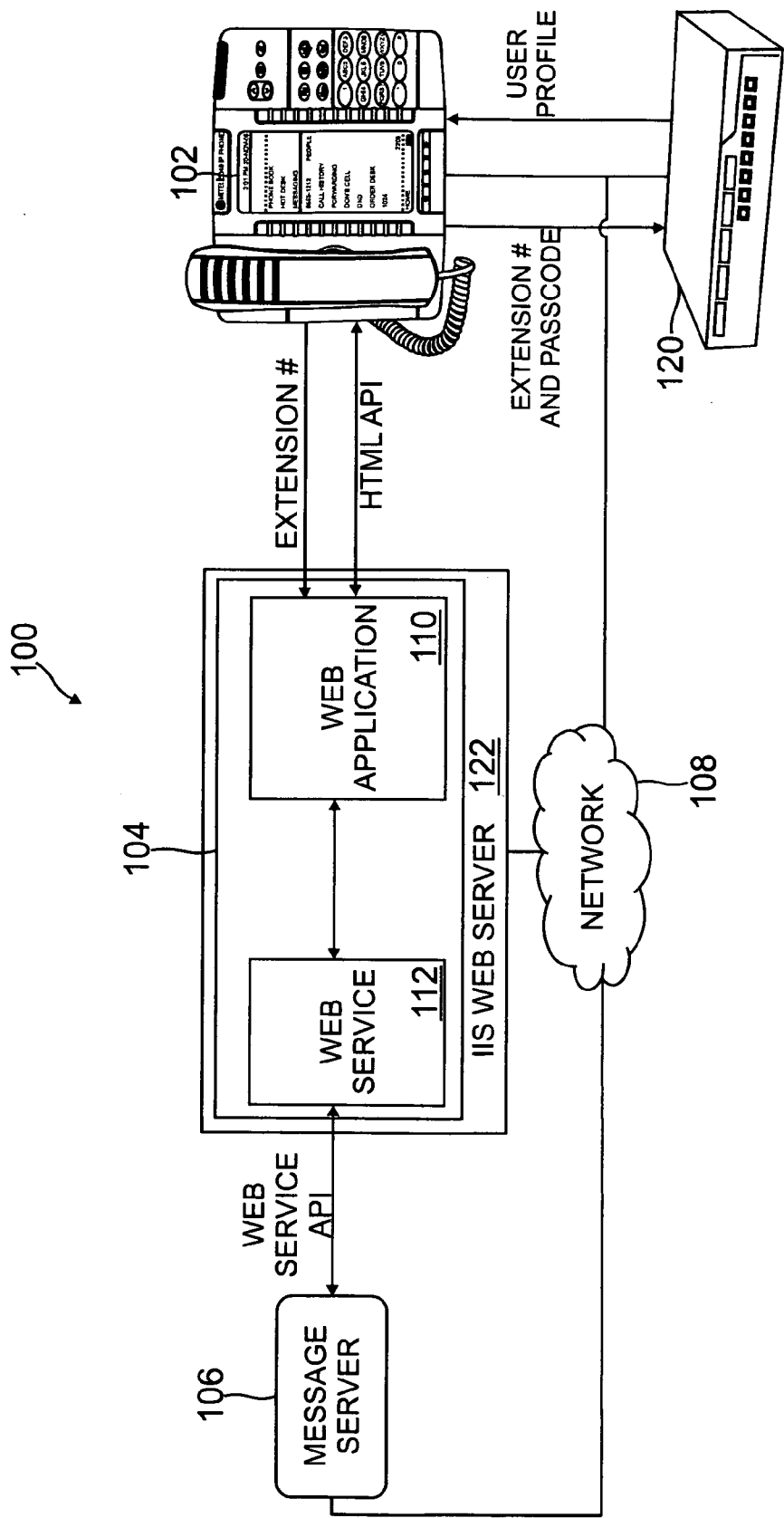
FIG. 1 depicts an exemplary environment in which scheduling information can be distributed in accordance with one aspect of the present application.

As shown in FIG. 1, an exemplary environment 100 in which scheduling information can be distributed in accordance with one aspect of the present application is provided. A user can retrieve their scheduling information using an IP phone 102, a server application 104, and a message server 106. A phone system 120 can be used as well. In the exemplary environment 100, the IP phone 102, the server application 104, the message server 106, and the phone system 120 can be connected to a network 108. The environment 100 illustrated in FIG. 1 is provided for purposes of illustration and should not be construed as the only environment 100 in which the present application can be used in. Fewer or more components can also be used within FIG. 1.

In typical embodiments, the components can include logical connections. These logical connections can be achieved by a communication device coupled to or integral with the IP phone 102, the server application 104, the message server 106, and the phone system 120. The communication devices are not limited to any particular type of communication device. The logical connections can be connected to the network 108, which can take the form of a local area network, wide area network, personal area network, campus area network, metropolitan area network, or global area network. Such networking environments are commonplace in office networks, enterprise-wide computer networks, intranets and the Internet, which are all types of networks 108.

The communications between the IP phone 102, the server application 104, the message server 106, and the phone system 120 described herein can be implemented as logical operations and/or modules in one or more systems. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiments described herein can be referred to variously as operations, steps, objects, or modules. Furthermore, it should be understood that logical operations can be performed in any order, unless explicitly claimed otherwise or a specific order is inherently necessitated by the claim language.

Individually, the IP phone 102, the server application 104, and the message server 106 will be described below. The phone system 120 will be described with the IP phone 102. Numerous features and functions are provided within the description of each and will become more apparent from the following discussion. From time to time, FIG. 1 will be referred back to when discussing each component of the environment 100.

IP Phone

Figure 2:
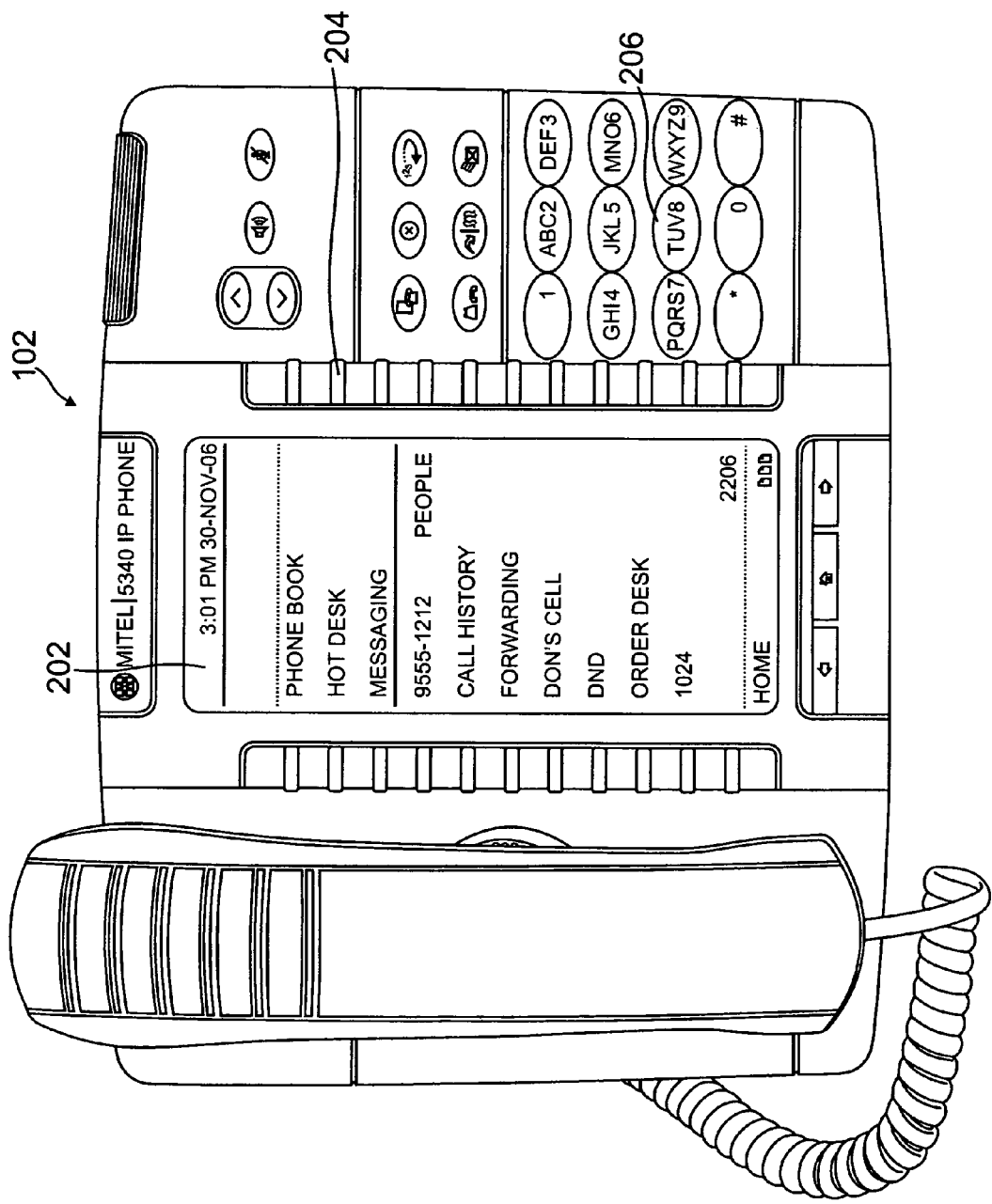
FIG. 2 shows a typical IP phone that can display a user's scheduling information in accordance with one aspect of the present application.

With reference now to FIG. 2, a typical IP phone 102 that can display user scheduling information in accordance with one aspect of the present application is provided. As shown, the IP phone 102 can include a graphics display 202, feature access buttons 204, and a keypad 206. While described as primarily working with an IP phone 102, those skilled in the relevant art will appreciate that other types of phones can be used.

Typically, the graphics display 202 can be a liquid crystal display. The display 202 can show text, images, and in some embodiments, moving pictures. Generally, most displays 202 can be provided in color. Touch-screen technologies, known to those skilled in the art, can also be implemented on the display 202 removing the need for feature access buttons 204, and possibly the keypad 206. As understood, the display 202 is typically built to show a large amount of information including scheduling information, emails, contacts, or any other information that can be pulled from of the message server 106.

In some embodiments, the IP phone 102 can display HyperText Markup Language (HTML) or some other form of markup language such as Extensible Markup Language (XML). In one embodiment, the IP phone 102 can execute Java applications. In these embodiments, a browser can be installed or supported by the IP phone 102 to parse and render the HTML or XML.

Continuing with FIG. 2, feature access buttons 204 can be located to the side of the display 202. The buttons 204 can be aligned such that graphics provided on the display 202 can match features associated with those buttons 204. When pressed, the buttons 204 can implement the specific feature provided on the display 202. For example, the user can press a button 204 that corresponds with a "Hot Desk" feature or a "My Next Meeting" feature. Other buttons 204 can be associated with different features, for example, accessing the user's contacts and opening their email from the IP phone 102.

As further illustrated in FIG. 2, the IP phone 102 can include a keypad 206, which can provide input. Typically, the input is provided in the form of numerical information. As will be shown below, the user can enter their extension through the keypad 206. The user can also provide a passcode or password to the phone 102 using the keypad 206.

Returning to FIG. 1, as shown, the phone 102 can communicate with the phone system 120 to log the user into the phone 102. The act of logging in causes the phone 102 to assume the user's profile that is stored in the phone system 120, which can be referred to as a "Hot Desk" feature above. In one embodiment, the user can provide their extension number (#) and passcode to the phone system 120. After a successful login, the phone system 120 can return the user's profile to the phone 102.

The phone 102 can have an HTML based application programming interface (API) that allows an external HTML based application to use the phone's graphical display 202. The API can allow the external HTML application to be notified of button 204 presses on the phone 102. The API can also provide the IP address of the external web application 110 to the phone 102. Alternatively, an XML or Java based phone API supplied by the phone manufacturers can be provided rather than the HTML API. In operation, the external application can use the phone's display 202 and buttons 204 in the same manner as a PC based web application uses the PC's display and keyboard. The external application provided by the server application 104 can provide numerous capabilities to the user of the phone 102.

Continuing with FIG. 1, the phone 102 can also provide the server application 104 with the extension # to access scheduling information. The extension # can be provided through the API described above, or can be part of a separate channel that interfaces with the server application 104.

In some embodiments, the phone 102 can have access to other information associated with the user. For example, the user's emails can be fed directly into the IP phone 102. The user's contacts can also be provided. Generally, information that can be provided by the message server 106 can be served and displayed by the phone 102. In some embodiments, the user can schedule meetings, change meeting times, or cancel meetings through the phone 102. The feature access buttons 204 along with the keypad 206 can be used to perform a variety of functions.

IP Phone Operations

Through the IP phone 102, a number of operations can be performed. A "Hot Desk" feature can be used to log the user into the phone using an extension number and passcode, which will be shown within FIG. 3A. This feature can cause the phone to retrieve a user profile from the phone system 120. In addition thereto, the IP phone 102 can be used to retrieve a user's scheduling information as depicted in FIG. 3B. Generally, the user can enter their username and password so that the scheduling information can be obtained from the message server 106. Often, the credentials are stored by the server application 104, which facilitates communication between the IP phone 102 and the message server 106. While numerous processes are provided, those skilled in the relevant art will appreciate that fewer or more processes can be used.

Figure 3A:
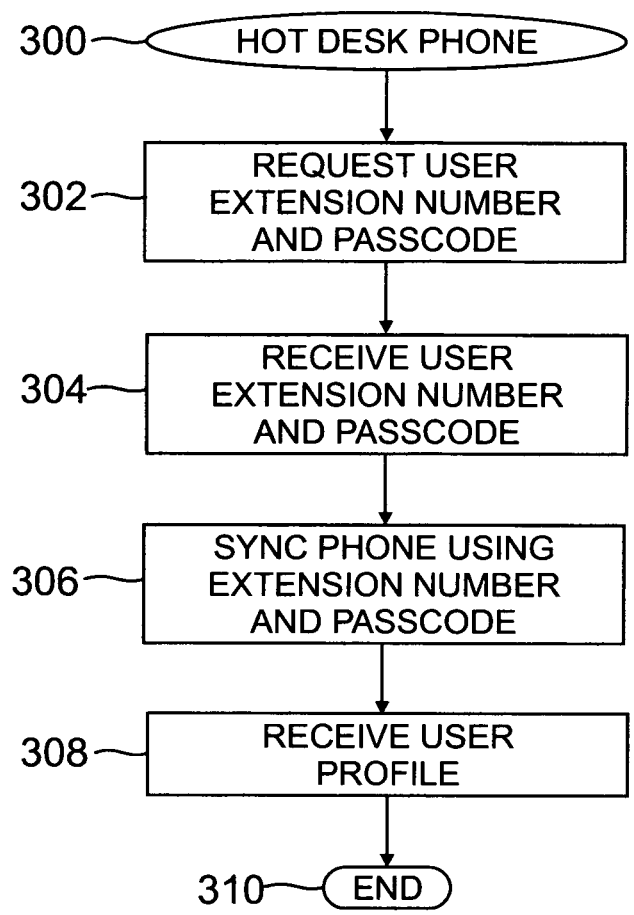
FIG. 3A is a flow chart providing exemplary processes for syncing the IP phone with a user's profile in accordance with one aspect of the present application.
Figure 3B:
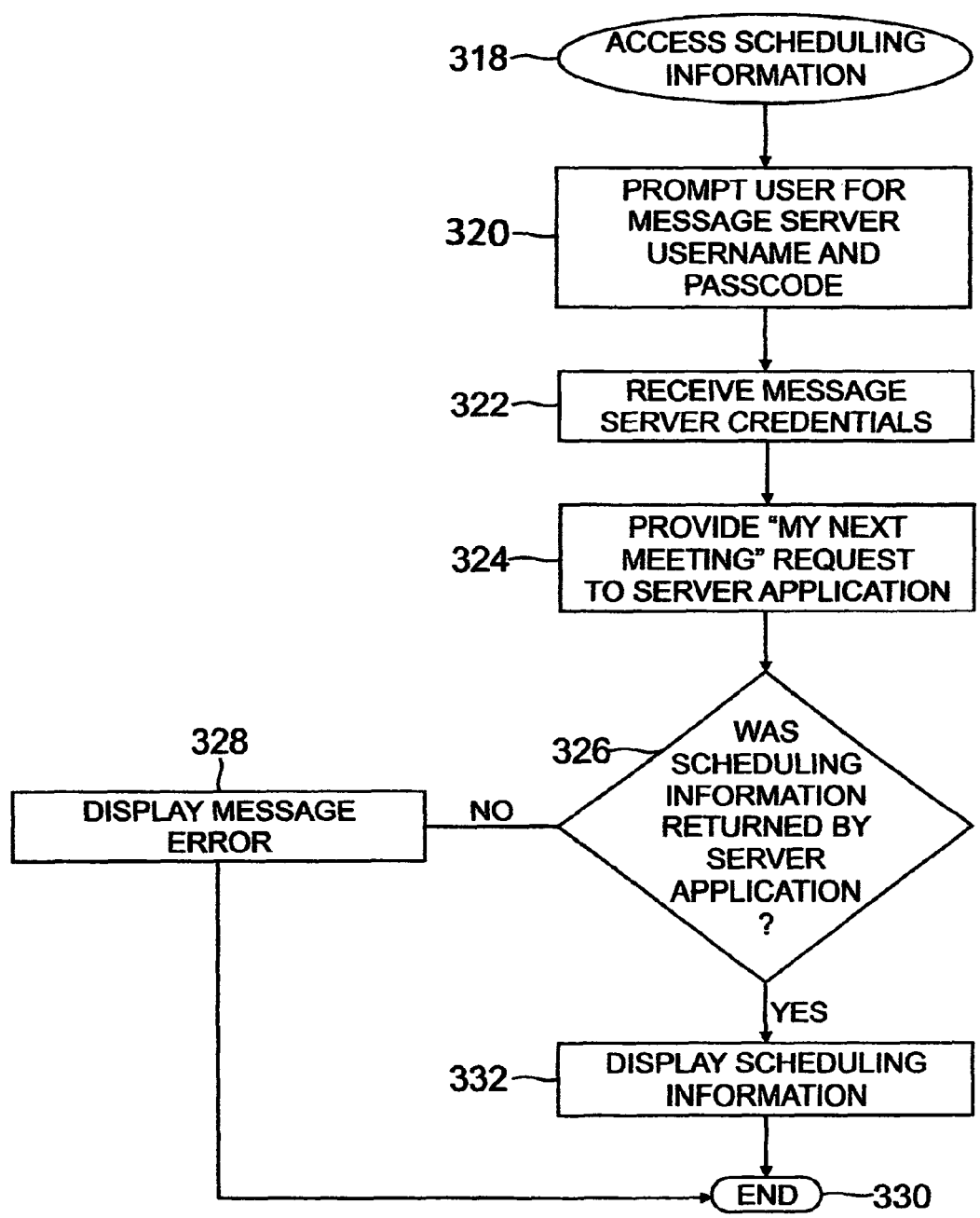
FIG. 3B illustrates a flow chart that provides exemplary IP phone processes for retrieving and displaying the user's scheduling information in accordance with one aspect of the present application.

With reference now to FIG. 3A, a flow chart providing exemplary processes for syncing the IP phone 102 with a user's profile in accordance with one aspect of the present application is provided. The provided flow chart is one way to "Hot Desk" the IP phone 102 and should not be construed as the only way. The processes can begin at block 300.

In typical embodiments, before the user can access scheduling information from the message server 106, the user can initiate a "Hot Desk" feature shown within FIG. 4A, which depicts a typical screen on the display 202 of the phone 102. The exemplary screen also shows other options that can include a "Phone Book" feature, a "Messaging" Feature, attendees and a "My Next Meeting" feature which will be described below. Each of these features can be associated with a feature access button 204, which is implied in FIG. 4A.

At block 302 of FIG. 3A, and when the "Hot Desk" feature is initiated, the phone 102 can request for information from the user so that the phone 102 can be connected with the phone system 120. Generally, the user provides their extension number. In one embodiment, the user can enter in their work number. The user can also provide a passcode associated with their extension number. At block 304, the phone 102 can receive user information entered in by the user.

The phone 102 can then sync with the phone system 120 at block 306. The user provided information can be sent to the phone system 120 and thereafter the phone system 120 can provide user profile information to the phone 102. At block 308, the phone 102 can receive the user profile. By running the user profile on top of the phone 102, the phone, in essence, acts as a proxy for the user's home computer. Through the "Hot Desk" feature, the user can gain access to the "My Next Meeting" feature, as well as many other features and options, on the phone 102. The processes can end at block 310.

In typical embodiments, after the user profile is retrieved from the phone system 120, the user can access their scheduling information. FIG. 3B illustrates a flow chart that provides exemplary IP phone 102 processes for retrieving and displaying the user's scheduling information in accordance with one aspect of the present application. The processes can begin at block 318.

As shown in FIG. 4A, a button 204 on the phone 102 associated with a "My Next Meeting" option is provided. Generally, the first time the user invokes the "My Next Meeting" feature, or any other feature to retrieve information off the message server 106, the user can be prompted to enter their message server username and password at block 320. At block 322, the phone 102 can receive these message server credentials.

The phone 102 can then make a request to the server application 104 for user scheduling information at block 324. This can be performed via the API provided by the phone 102. Initially, the username and password can be sent with the request as well as the extension number. In addition, the phone device ID can be provided. In turn, the server application 104 can log into the message server 106 using the username and password with the message server 106 providing the scheduling information which can then be displayed on the phone 102 that sent the button notification.

After the initial login, the user provided information can typically be stored on the server application 104 so that the user does not have to enter it again. In future logins, the application 104 can skip having to ask the user for their message server username and password and automatically log the user into the message server 106 without having to ask for the user credentials. In typical embodiments, once the information is stored within the server application 104, the user can use any phone to connect to the server application 104 using their extension number.

At decision block 326, a determination is made by the phone 102 whether scheduling information was received from the server application 104. Typically, the phone 102 can make this determination through error messages received by the server application 104. An error message can arise when no scheduling information is stored within the message server 106. Alternatively, an error message can be provided when a network error occurs. Those skilled in the relevant art will appreciate that different errors can arise for a number of different reasons.

When scheduling information has not been returned by the server application 104, the phone 102 can provide a message on the display 202 indicating an error occurred when trying to retrieve the scheduling information at block 328. In typical embodiments, the error message can provide specific details on why the error occurred, for example, that there was no scheduling information for the user. The phone 102 processes can then end at block 330.

Returning to decision block 326, when scheduling information is returned by the server application 104, the information can be displayed at block 332. A separate screen can be shown as depicted in FIG. 4B. On the screen, the date, time, topic, and location can be listed. In addition, attendees can also be shown.

In one embodiment, the IP phone 102 can be used to contact missing or absent attendees. As shown in FIG. 4B, the attendees are "Don Smith", "Simon Binder", "Maureen Young", and "John Doe". The IP phone 102 can be linked such that it can have direct access to the attendee's office phone or mobile phone so that the missing attendee can be reached. For example, a user of the phone 102 can select "Don Smith". When selected, the attendee's information can be shown as depicted in FIG. 4C. The information can include, but is not limited to, the attendee's cell phone, work phone, instant message identifier, and email address. In the same or related embodiment, the phone 102 can reach the attendee at another scheduled meeting typically through a phone located at the meeting site. The meeting information for the attendee can be pulled from the message server 106. In one embodiment, the meeting information can be displayed on the attendee's phone when called.

The user can also view the scheduling information for the current day, as depicted in FIG. 4D, by pressing an access button 204 associated with the "View Today" feature. Those skilled in the relevant art will appreciate that there are numerous types of screens that can be shown when presenting the scheduling information and those presented above should not be construed as limiting the present application. Information that can be displayed on the IP phone 102 can include, but is not limited to, the subject, date, start time, duration, and attendees of the meeting.

In one embodiment, instead of retrieving information from the display 202, the user can call into the server application 104 to retrieve their scheduling information. When called, the server application 104 can obtain the user's scheduling information from the message server 106 and provide that information to the IP phone 102 using an automated voice system. The phone 102 processes can end at block 330.

Server Application

Previously described, the user logged into the phone system 120 causing the phone 102 to assume the user's profile. The phone 102 could then present the features that they had programmed against their use profile. For example, the "My Next Meeting" feature presented above could be one of these features and could allow the user to access their scheduling information on the phone 102. When the user pressed the button 204 associated with the "My Next Meeting" feature, the API would enable the server application 104 to receive button press indications for that button 204. The phone 102 would know who is logged in because of the extension number used to log in. The extension number could then be passed to the server application 104 via the phone API so the application could use those credentials to log into the messaging server 106. The server application 104 will now be described in more details.

The application 104 can run on a server that has a combination of hardware and software designed to retrieve and provide services to the phone 102 and the message server 106. In one embodiment, the server can be a private branch exchange (PBX) phone system. In another embodiment, the server can be a communication service provider. Those skilled in the relevant art will appreciate that the functions and features provided below by the server application 104 can run on top of numerous platforms such as Microsoft's Internet Information Server Web Server®, which is depicted in FIG. 1.

As shown, the server application 104 can include a web application 110 and a web service 112. The web application 110 can serve up the phone interface used to invoke numerous features and display the scheduling information on the user's phone 102. The web service 112 can interface with a data repository contained within the company's message server 106 to extract the user's scheduling information. In one embodiment, the web service 112 can be programmed to directly interface with Microsoft's Exchange Server®, which is one type of message server.

The web service 112 can also utilize an API provided by the message server 106. Access to the data stored in the message server 106 can be from across an intranet as well as the Internet, making for a flexible solution from a deployment perspective. Security can be maintained through use of individual user credentials provided by the user to gain access to the data stored within the message server 106. These credentials can be stored by the server application 104 to avoid requiring the user to re-enter them every time they want to use the application.

When extracting the scheduling information from the message server 106, several options can be provided. The extracted information can be determined by the user through the phone 102. In one embodiment, when extracted, the scheduling information can include information on the current date. In another embodiment, the extracted information can include the next scheduling entry based on the current time. When there are no subsequent entries for that day, the server application 104 can extract the scheduling information for the following day. If no entries are entered for that day, then the server application 104 can continue to search through the schedule until an entry is found. In other embodiments, the server application 104 can provide an error message or some other indicator that no scheduling information can be found.

Server Application Operations

Figure 5:
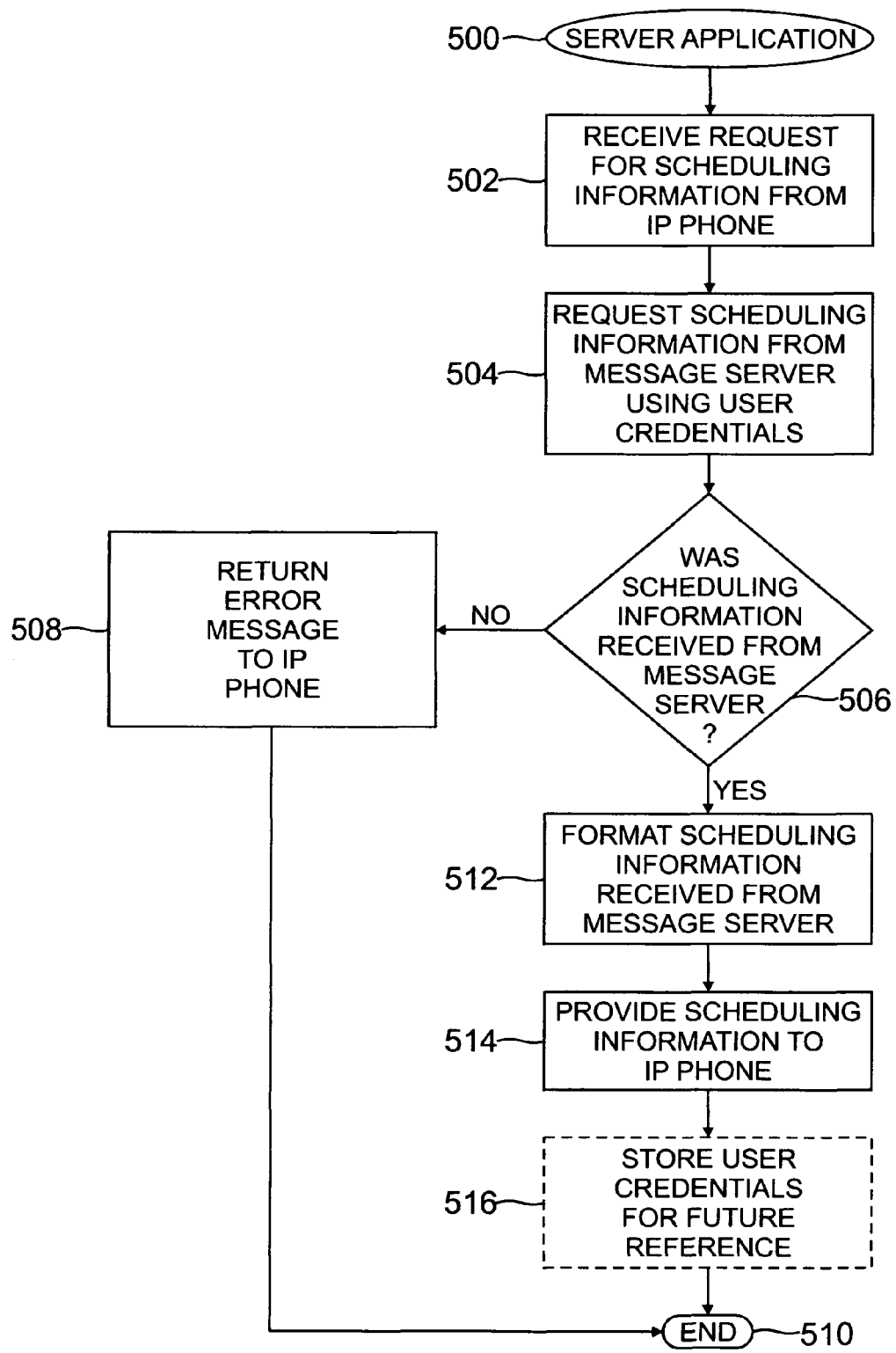
FIG. 5 represents a flow chart showing exemplary processes for a typical server application in accordance with one aspect of the present application.

FIG. 5 represents a flow chart showing exemplary processes for a typical server application 104 in accordance with one aspect of the present application. The processes can begin at block 500. At block 502, the server application 104 can receive a request for scheduling information from the phone 102. Generally, this can be performed using an API, the API also providing the interface displayed on the phone 102 that the user can enter credentials into. This can occur on the web application 110 side of the server application 104.

At block 504, the server application 104 can request scheduling information from the message server 106 using user credentials. This can occur on the web service 112 side of the server application 104. The web service 112 can use an API generated by the message server 106 to communicate back and forth with the message server 106. In typical embodiments, the user credentials can include the user's message server username and password, which was entered by the user using the phone dial pad or touch screen keyboard the first time they invoked the "My Next Meeting" feature. As described above, the user information can be the same as what the user provides to log into their PC.

At decision block 506, the server application 104 can determine whether the scheduling information was received from the message server 106. Typically, the message server 106 can return an error message when the message server 106 cannot locate scheduling information for the user. In another embodiment, an error message can be returned when the user cannot be verified. Known to those skilled in the art, numerous types of errors can occur.

When the message server 106 returns an error message to the server application 104, at block 508, an error message can be returned to the phone 102. In one embodiment, the user can be verified by the server application 104, instead of the message server 106. The processes for the server application 104 can end at block 510.

Returning to decision block 506, when the server application 104 receives scheduling information from the message server 106, the scheduling information can be formatted at block 512. This can occur on the web application 110. Typically, the formatting includes changing the information to a markup language, such as XML or HTML, so that the IP phone 102 can parse and render it.

At block 514, the server application 104 can provide the scheduling information to the phone 102. At optional block 516, the server application 104 can store the user's credentials for future reference. The user's credentials can be stored in conjunction with the phone's information so that the user can log in more than one time. The credentials can be stored in the server application 104 against the extension number for the user who provided them. By doing this, typically any phone 102 can assume the user's profile. When the user credentials have been stored, and when the "My Next Meeting" feature is invoked, the server application 104 can simply look up the user's credentials for that extension number and automatically log them into the message server 106. In other embodiments, the information can be stored on the message server 106 or the IP phone 102. The processes for the server application 104 can end at block 510.

Message Server

As shown in FIG. 1, and described above, the message server 106 can locate the user's scheduling information and provide it to a server application 104. Associated with the message server 106 can be a data repository. The message server 106 can be deployed by a company that typically stores scheduling data for the user's client calendar application, e.g. Microsoft Outlook®. The Microsoft Exchange Server® is a popular message system 106 that can include a mail server, an e-mail client, and groupware applications, the most commonly used being a calendar and contact application. While not dependent on Microsoft Outlook®, the present application can be used to work with Microsoft Outlook®. Those skilled in the relevant art will appreciate that there can be a number of different alternatives.

In typical embodiments, the message server 106 can provide a web service API that allows a third party application, such as the server application 104, to gain access to its data. The API can be utilized to extract the data to be displayed on the user's IP phone 102.

Message Server Operations

Figure 6:
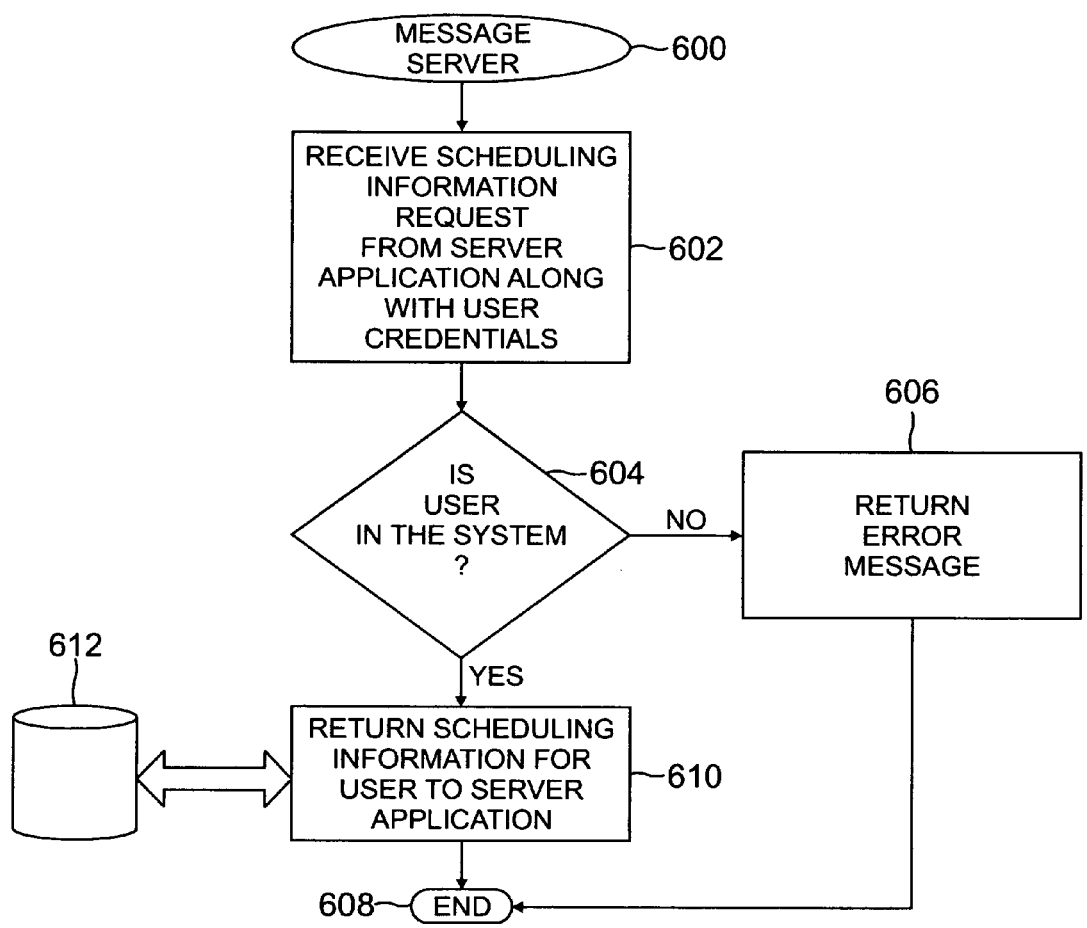
FIG. 6 shows exemplary processes for the message server in accordance with one aspect of the present application.

FIG. 6 shows exemplary processes for the message server 106 in accordance with one aspect of the present application. The processes can begin at block 600. At block 602, the message server 106 can receive a scheduling information request from the server application 104. User credentials can be provided by the server application 104 to the message server 106.

At decision block 604, the message server 106 can determine whether the user is in the system. Typically, this can be determined by the act of logging into the message server 106 using the user credentials. When the login fails, the user is invalid or the credentials provided by the user are incorrect. The message server 106 can also check whether there is any scheduling information. At block 606, and when no scheduling information can be located for the user or they cannot be verified, the message server 106 can return an error message to the server application 104. The processes can end at block 608.

When the user can be logged in, the scheduling information for the user can be returned by the message server 106 at block 610. The message server 106 can retrieve the scheduling information from the data repository 612. The repository 612 can be updated through a PC based application that is operated from the user's PC. The processes can end at block 608.

Systems, Methods, and Operations

In accordance with one aspect of the present application, a system is presented. The system can include an IP phone displaying a user's profile. The user's profile displayed on the IP phone can provide a calendar feature that, when selected, retrieves calendar information from a message server through a server application, the message server storing the calendar information on a central repository.

In one embodiment, the user's profile displayed on the IP phone can be received from a phone system, the phone system verifying an extension number and a passcode received from the IP phone to provide the IP phone with the user's profile. In one embodiment, a second IP phone can display the user's profile received from the phone system, the second IP phone retrieving the calendar information from the message server through the server application when the calendar feature is selected. In one embodiment, a username and a password can be stored with an extension number of the IP phone on the server application after an initial login to the message server.

In accordance with another aspect of the present application, a phone is provided. The phone can include an input device, a display, at least one processor, and a memory operatively coupled to the processor, the memory storing program instructions that when executed by the processor, causes the processor to perform processes. The processes can include receiving user information from the input device and associating the phone with a profile using the user information. In addition, the processes can include providing the profile on the display and receiving receive user credentials from the input device. The processes can also include accessing scheduling information using the user credentials and providing the scheduling information on the display.

In one embodiment, the user information can include an extension number and a passcode. In one embodiment, the user credentials can include a username and a password. In one embodiment, associating the phone with the profile using the user information can include retrieving the profile from a phone system. In one embodiment, scheduling information can be received in a markup language.

In one embodiment, the memory storing program instructions, when executed by the processor, causes the processor to further receive input from the input device for adjusting the scheduling information. In one embodiment, adjusting the scheduling information can include cancelling a meeting. In one embodiment, adjusting the scheduling information can include changing a time for a meeting. In one embodiment, the memory storing program instructions, when executed by the processor, causes the processor to further receive input from the input device for contacting a meeting attendee.

In accordance with yet another aspect of the present application, a method for providing user data stored within a repository to a network phone synced with a user profile is provided. The method can include receiving user identification information from the network phone synced with the user profile. In addition, the method can include retrieving the user data stored within the repository using the user identification information. The method can also include formatting the user data retrieved from the repository. The method can include providing the formatted user data to the network phone synced with the user profile.

In one embodiment, the method can include providing an interface for display on the network phone whereby the user identification information is entered in and the user data is shown. In one embodiment, the method can include storing the user identification information on the server.

In one embodiment, retrieving the user data stored within the repository can include accessing a calendar based application. In one embodiment, accessing the calendar based application can include extracting user appointments on a date of access. In one embodiment, accessing the calendar based application can include extracting a next appointment. In one embodiment, formatting the user data can include setting up the user data within a markup language.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. An Internet Protocol (IP) phone comprising:
an input device;
a display;
at least one processor; and
a memory operatively coupled to said processor, said memory storing program instructions that when executed by said processor, causes said processor to:
initially receive user login information from said input device;
associate said phone with a profile using said user login information;
provide said profile on said display;
receive a user credentials for a message server from said input device;
store the user message server credentials against the user login information;
later receive the user login information from the input device or another IP phone and look up the stored user credentials for the user login information;
access calendar information from the message server using said stored user credentials; and
provide said calendar information on said display.

2. The phone of claim 1, wherein said user login information comprises an extension number and a passcode.

3. The phone of claim 1, wherein said user message server credentials comprise a username and a password.

4. The phone of claim 1, wherein associating said phone with said profile using said user information comprises retrieving said profile from a phone system.

5. The phone of claim 1, wherein said calendar information is received in a markup language.

6. The phone of claim 1, wherein said memory storing program instructions, when executed by said processor, causes said processor to further receive input from said input device for adjusting said calendar information.

7. The phone of claim 6, wherein adjusting said calendar information comprises cancelling a meeting.

8. The phone of claim 6, wherein adjusting said calendar information comprises changing a time for a meeting.

9. The phone of claim 1, wherein said memory storing program instructions, when executed by said processor, causes said processor to further receive input from said input device for contacting a meeting attendee.

10. A system comprising:
an Internet Protocol (IP) phone and a server, the IP phone comprising:
an input device;
a display;
at least one processor; and
a memory operatively coupled to said processor, said memory storing program instructions that when executed by said processor, causes said processor to:
initially receive user login information from said input device;
associate said phone with a profile using said user login information;
provide said profile on said display;
receive user credentials for a message server from said input device;
the server comprising at least one processor and a memory operatively coupled to said processor, said memory storing program instructions comprising a server application that when executed by said processor, causes said processor to perform functions, wherein said system is configured to:
cause the user message server credentials to be stored against the user login information;
later receive the user login information from the input device or another IP phone and look up the stored user credentials for the user login information;
cause the stored user credentials to be used to access calendar information from the message server; and
provide said calendar information to a user.

11. The system of claim 10, wherein said user login information comprises an extension number and a passcode.

12. The system of claim 10, wherein said user message server credentials comprise a username and a password.

13. The system of claim 10, wherein associating said phone with said profile using said user information comprises retrieving said profile from a phone system.

14. The system of claim 10, wherein said calendar information is received in a markup language.

15. The system of claim 10, wherein said system is configured to further receive input from said input device for adjusting said calendar information.

16. The system of claim 15, wherein adjusting said calendar information comprises canceling a meeting.

17. The system of claim 15, wherein adjusting said calendar information comprises changing a time for a meeting.

18. The system of claim 10, wherein said system is configured to further receive input from said input device for contacting a meeting attendee.

19. A method comprising:
initially receiving user login information from an input device of an Internet Protocol (IP) phone;
associating said IP phone with a profile using said user login information;
providing said profile on a display of said IP phone;

receiving user credentials for a message server from said input device;
storing the user message server credentials against the user login information;
later receiving the user login information from the input device or another IP phone and looking up the stored user credentials for the user login information;
using the stored user credentials to access calendar information from the message server; and
providing said calendar information to said user.

* * * * *